Patented July 11, 1939

2,165,960

UNITED STATES PATENT OFFICE 2,165,960

AGE RESISTOR

Albert M. Clifford, Stow, Ohio, assignor to Wingfoot Corporation, Wilmington, Del., a corporation of Delaware No Drawing. Application January 17, 1936,
Serial No. 59,569

15 Claims. (Cl. 18—50)

This invention relates to the manufacture of rubber and, more particularly, to improved age resistors having the function of retarding deterioration of rubber articles in use due to the effects of light, heat, air, flexing and the like. It is among the objects of the invention to retard or lessen the effect of these influences on the rubber article.

This object is achieved by incorporating in or otherwise treating the rubber with amino derivatives of the diarylene oxides, the same being unsubstituted or substituted by an aryl group. These compounds have been found to be very desirable preservatives or age retarders for the purpose intended. As examples of the class may be mentioned the unsubstituted 2-7-diamino biphenylene oxide and the 2-amino biphenylene oxide having, respectively, the structural formulae

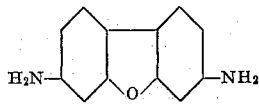

and

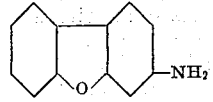

Other compounds of the same type, having a varying number of amino groups or having these differently positioned in the nucleus, are also suitable.

The aryl-substituted biarylene oxides may be illustrated by 2-7-di(beta naphthylamino) biphenylene oxide and 2(beta naphthylamino) biphenylene oxide having the respective formulae:

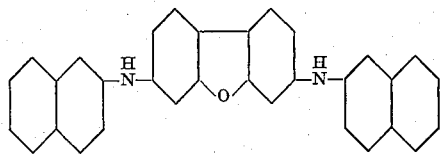

and

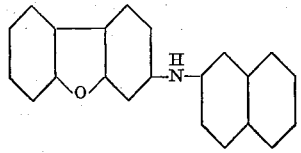

Still other amino biarylene oxides may also be used, such as mono amino and diamino ditolylene oxides, their derivatives in which the amino groups have been substituted by phenyl, tolyl, xylyl, naphthyl, or other aryl- groups, and mono amino and diamino binaphthylene oxides, substituted or not by aryl groups such as phenyl, tolyl, xylyl and naphthyl groups. Thus, there may be used 2-7-di(phenyl amino) ditolylene oxide, 2-phenyl amino ditolylene oxide, 2-tolyl amino ditolylene oxide, 2-phenyl amino dinaphthylene oxide, 2-tolyl amino dinaphthylene oxide, 2-7-dixylyl amino dinaphthylene oxide, 2-7-di-(naphthylamino) naphthylene oxide, and other aryl substituted biarylene oxides.

The amino biarylene oxides can be obtained by following any one of several methods, 2-7-diamino biphenylene oxide being conveniently obtained by first nitrating biphenylene oxide and then reducing the resulting 2-7-dinitro diphenylene oxide with iron filings and hydrochloric acid or ammonium chloride. The related 2-amino biphenylene oxide, melting at 194° C., may be prepared by reducing the corresponding mono nitro biphenylene oxide.

The aryl substituted amino biarylene oxides may be prepared very simply, by interacting phenolic compounds, such as alpha and beta naphthol, with an unsubstituted amino derivative of the desired biarylene oxide. Thus, 2-7-di(beta naphthyl amino) biphenylene oxide may be obtained by interacting beta naphthol and 2-7-diamino biphenylene oxide and 2(beta naphthylamino) biphenylene oxide may be prepared by interacting beta naphthol and 2-amino biphenylene oxide.

The composite products obtained by interacting the amino biarylene oxides with the phenolic compounds also constitute effective antioxidants without separation of constituents in the reaction mass. Thus, antioxidants may be prepared by autoclaving 2-amino biphenylene oxide or 2-7-diamino biphenylene oxide, or other primary amino biarylene oxide with cresylic acid, (mixed cresols), hydroquinone, tolu hydroquinone, p-amino phenol, ortho amino meta cresol, amino naphthols, iso propyl naphthol, or other alkylated naphthol, p-hydroxy biphenyl, etc.

These compounds, to which the invention relates, may be added with satisfactory results to substantially any of the ordinary rubber compounds. Their effect in such rubber compounds was tried out in test sheets made up according to the following formula:

| | Parts |
|---|---|
| Extracted rubber | 100 |
| Zinc oxide | 5 |
| Sulphur | 3 |
| Hexamethylene tetramine | 1 |
| Stearic acid | 1.5 |
| Antioxidant | 1 | which were then subjected to a low temperature accelerated ageing test in which the sheets are aged for six days in an oxygen bomb at a temperature of 50° C. and under a pressure of 150 pounds per square inch. The following results were obtained for the compounds 2-7-diamino biphenylene oxide and 2-amino biphenylene oxide.

2, 7 diamino biphenylene oxide

| Cure | Original | | | | Aged | | | | Percent wt. inc. |
|---|---|---|---|---|---|---|---|---|---|
| | Modulus kgs/cm.$^2$ | | Tens. | Elong. | Modulus kgs/cm.$^2$ | | Tens. | Elg. | |
| | 500% | 700% | | | 500% | 700% | | | |
| 35/285 | 20 | 75 | 156 | 830 | 24 | 89 | 144 | 785 | ----- |
| 50 | 28 | 108 | 180 | 790 | 33 | 131 | 173 | 750 | ----- |
| 70 | 37 | 149 | 187 | 740 | 40 | 159 | 181 | 725 | ----- |

2-amino biphenylene oxide

| 35/285 | 16 | 48 | 128 | 870 | 16 | 27 | 99 | 800 | .30 |
|---|---|---|---|---|---|---|---|---|---|
| 50 | 21 | 78 | 154 | 815 | 23 | 44 | 126 | 755 | .33 |
| 70 | 32 | 120 | 200 | 785 | 39 | ----- | 42 | 570 | ----- |

Further tests were also carried out at higher temperatures in a stock having the following composition:

| | Parts by weight |
|---|---|
| Smoked sheets | 100 |
| Carbon black | 0.6 |
| Zinc oxide | 92.6 |
| Sulphur | 3.5 |
| Iron oxide | 0.8 |
| Diphenylguanidine | 0.7 |
| Antioxidant | 5.0 | and the results obtained are tabulated as follows:

| Cure | Original | | | | Aged | | | | Percent wt. inc. |
|---|---|---|---|---|---|---|---|---|---|
| | Modulus kgs/cm.$^2$ | | Tens. | Elong. | Modulus kgs/cm.$^2$ | | Tens. | Elg. | |
| | 300% | 500% | | | 300% | 500% | | | |

2, 7 diamino biphenylene oxide

| 35/285 | 37 | 105 | 182 | 630 | 44 | 110 | 102 | 505 | ----- |
|---|---|---|---|---|---|---|---|---|---|
| 50 | 41 | 115 | 200 | 635 | 52 | 115 | 120 | 510 | ----- |
| 70 | 46 | 125 | 230 | 650 | 64 | ----- | 110 | 435 | ----- |

2-amino biphenylene oxide

| 35/285 | 26 | 76 | 158 | 655 | 21 | 48 | 60 | 585 | ----- |
|---|---|---|---|---|---|---|---|---|---|
| 50 | 28 | 82 | 196 | 690 | 25 | 59 | 80 | 595 | ----- |
| 70 | 32 | 91 | 208 | 690 | 30 | 70 | 95 | 590 | ----- |

It will be noted that, in the low temperature ageing tests, the compounds imparted satisfactory resistance to ageing as indicated by the maintenance of the tensile strength of the test sheet at a large fraction of its original value before ageing. In the case of high temperature testing, there is, of course, a greater falling off of tensile strength due to the severer conditions of the test, but, in no instance was the test piece reduced to a resinous mass devoid of strength.

All of these antioxidants described above are substantially non-toxic in nature and substantially non-odorous. They may, therefore, be employed in rubber factories without unusual precautions to prevent harmful effects upon the workmen employed in handling them. They are readily prepared from comparatively inexpensive starting materials and blend readily with the rubber compounds to produce a stock of high uniformity.

This application is a continuation in part of applications Serial Nos. 598,301, filed March 11, 1932, and 618,087, filed June 18, 1932.

It will be apparent that the invention includes a large number of compositions and is merely illustrated by the examples given above, other compounds of the same class also being suitable for use in preserving rubber, by which term is meant to include rubber, balata, gutta percha, synthetic rubber, latex and the like whether or not admixed with fillers, pigments, accelerators, etc. It is, accordingly, intended that the patent shall cover, by suitable expression in the appended claims, all features of patentable novelty residing in the invention.

What I claim is:

1. A method of preserving rubber which comprises treating the same with an amino derivative of a biarylene oxide to impart age-resisting properties to said rubber.

2. A method of preserving rubber which comprises treating the same with a monoamino derivative of a biarylene oxide to impart age-resisting properties to said rubber.

3. A method of preserving rubber which comprises treating the same with a diamino derivative of a biarylene oxide to impart age-resisting properties to said rubber.

4. A method of preserving rubber which comprises treating the same with an arylamino derivative of a biarylene oxide to impart age-resisting properties to said rubber.

5. A method of preserving rubber which comprises treating the same with a mono arylamino derivative of a biarylene oxide to impart age-resisting properties to said rubber.

6. A method of preserving rubber which comprises treating the same with a diarylamino derivative of a biarylene oxide to impart age-resisting properties to said rubber.

7. A method of preserving rubber which comprises treating the same with an amino derivative of biphenylene oxide to impart age-resisting properties to said rubber.

8. A method of preserving rubber which comprises treating the same with an arylamino derivative of biphenylene oxide to impart age-resisting properties to said rubber.

9. A method of preserving rubber which comprises treating the same with diamino biphenylene oxide to impart age-resisting properties to said rubber.

10. A method of preserving rubber which comprises treating the same with mono amino biphenylene oxide to impart age-resisting properties to said rubber.

11. A method of preserving rubber which comprises treating the same with di(beta naphthyl amino) biphenylene oxide to impart age-resisting properties to said rubber.

12. A rubber product which has been vulcanized in the presence of an amino derivative of a biarylene oxide.

13. A rubber product which has been vulcanized in the presence of an arylamino derivative of a biarylene oxide.

14. A rubber product which has been vulcanized in the presence of diamino biphenylene oxide.

15. A rubber product which has been vulcanized in the presence of di(beta naphthylamino) biphenylene oxide.

ALBERT M. CLIFFORD.